US011788893B1

(12) United States Patent
Harris et al.

(10) Patent No.: US 11,788,893 B1
(45) Date of Patent: Oct. 17, 2023

(54) NANOSCALE BOLOMETER OPERATING NEAR THE THERMODYNAMIC LIMIT

(71) Applicant: National Technology & Engineering Solutions of Sandia, LLC, Albuquerque, NM (US)

(72) Inventors: Charles Thomas Harris, Albuquerque, NM (US); Tzu-Ming Lu, Albuquerque, NM (US); Ting S. Luk, Albuquerque, NM (US); Peter Anand Sharma, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/718,778

(22) Filed: Apr. 12, 2022

Related U.S. Application Data

(60) Provisional application No. 63/178,077, filed on Apr. 22, 2021.

(51) Int. Cl.
  *G01J 5/02* (2022.01)
  *G01J 5/08* (2022.01)
  *G01J 5/20* (2006.01)

(52) U.S. Cl.
  CPC .............. *G01J 5/0215* (2013.01); *G01J 5/024* (2013.01); *G01J 5/0837* (2013.01); *G01J 5/0853* (2013.01); *G01J 5/20* (2013.01)

(58) Field of Classification Search
  CPC ........ G01J 5/0215; G01J 5/024; G01J 5/0837; G01J 5/0853; G01J 5/20
  See application file for complete search history.

(56) References Cited

U.S. PATENT DOCUMENTS

| | | | | |
|---|---|---|---|---|
| 5,777,328 A | * | 7/1998 | Gooch | H01L 27/1465 216/2 |
| 5,777,329 A | * | 7/1998 | Westphal | G01J 3/26 250/339.02 |
| 5,841,137 A | * | 11/1998 | Whitney | H04N 5/33 250/338.5 |
| 6,441,374 B1 | * | 8/2002 | Kawano | G01J 5/34 250/338.2 |
| 9,923,284 B1 | * | 3/2018 | Loui | H01Q 15/0086 |
| 10,101,212 B1 | * | 10/2018 | Cleary | G01J 5/10 |
| 11,604,139 B2 | * | 3/2023 | Piccoli | G01N 21/21 |
| 2003/0222217 A1 | * | 12/2003 | Luukanen | G01J 5/0837 250/336.2 |

(Continued)

OTHER PUBLICATIONS

Piper, J. R. et al., "Total Absorption by Degenerate Critical Coupling," Applied Physics Letters, 2014, vol. 104, pp. 251110-1-251110-4.

(Continued)

*Primary Examiner* — David P Porta
*Assistant Examiner* — Gisselle M Gutierrez
(74) *Attorney, Agent, or Firm* — Kevin W. Bieg

(57) ABSTRACT

A nanoscale bolometer for infrared (IR) thermal imaging comprises a subwavelength antenna that provides a specific detectivity approaching a fundamental, thermodynamic limit. The uncooled nanobolometer achieves performance comparable to cooled, high-performance, semiconductor photodetectors, but with significantly reduced size, weight, power, and cost.

30 Claims, 2 Drawing Sheets

(56) References Cited

U.S. PATENT DOCUMENTS

| | | | | |
|---|---|---|---|---|
| 2007/0220959 | A1* | 9/2007 | Sumant | G01Q 70/14 |
| | | | | 73/105 |
| 2008/0265164 | A1* | 10/2008 | Ouvrier-Buffet | G01J 5/20 |
| | | | | 250/338.4 |
| 2011/0049366 | A1* | 3/2011 | Yang | G01J 5/04 |
| | | | | 257/E31.093 |
| 2011/0057107 | A1* | 3/2011 | Agnese | G01J 5/20 |
| | | | | 250/338.3 |
| 2011/0240860 | A1* | 10/2011 | Talghader | G01J 5/0853 |
| | | | | 250/340 |
| 2016/0018267 | A1* | 1/2016 | Timofeev | G01J 5/024 |
| | | | | 438/54 |
| 2018/0045560 | A1* | 2/2018 | Chanda | G01J 3/027 |
| 2020/0025619 | A1* | 1/2020 | Almasri | G01J 5/046 |
| 2022/0107223 | A1* | 4/2022 | Ram | G01J 5/34 |
| 2022/0165468 | A1* | 5/2022 | Bandyopadhyay | H01Q 21/061 |
| 2022/0228917 | A1* | 7/2022 | Boudou | H04N 5/33 |
| 2022/0336511 | A1* | 10/2022 | Barbour | H01L 27/14625 |

OTHER PUBLICATIONS

Razzari, L. et al., "Extremely Large Extinction Efficiency and Field Enhancement in Terahertz Resonant Dipole Nanoantennas," Optics Express, 2011, vol. 19, pp. 26088-26094.

Sakat, E. et al., "Enhancing Thermal Radiation with Nanoantennas to Create Infrared Sources with High Modulation Rates," Optica, 2018, vol. 5, pp. 175-179.

Rezaei, S. D. et al., "On the Correlation of Absorption Cross-Section with Plasmonic Color Generation," Optics Express, 2017, vol. 25, pp. 27652-27664.

Peters, D. W. et al., "Metamaterial-Inspired High-Absorption Surfaces Thermal Infrared Applications," Proc. SPIE 7609, Photonic and Phononic Crystal Materials and Devices X, 76091C (2010), pp. 76091C-1-7609C-7.

Dao, T. D. et al., "MEMS-Based Wavelength-Selective Bolometers," Micromachines, 2019, vol. 10, 416, 12 pages.

Jung, J-Y., et al., "Infrared Broadband Metasurface Absorber for Reducing the Thermal Mass of a Microbolometer," Scientific Reports, 2017, vol. 7, 430, 8 pages.

* cited by examiner

NANOSCALE BOLOMETER OPERATING NEAR THE THERMODYNAMIC LIMIT

CROSS-REFERENCE TO RELATED APPLICATION

This application claims the benefit of U.S. Provisional Application No. 63/178,077, filed Apr. 22, 2021, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to infrared imaging and, in particular, a nanoscale bolometer operating near the thermodynamic limit.

BACKGROUND OF THE INVENTION

Photodetectors are a superior technology for infrared (IR) thermal imaging, both in detectivity and speed. See M. Vollmer and K.-P. Mollmann, *Infrared Thermal Imaging: Fundamentals, Research, and Applications*, 2nd Ed, Wiley (2018). However, this high level of performance comes at a premium. Photodetectors for IR imaging are manufactured from expensive semiconductors, such as HgCdTe and InSb, and also require cooling (77K), which further adds to cost, higher power requirements, and makes these systems sizable. Uncooled, microfabricated bolometers are a low-cost IR imaging alternative to photodetectors, and because of their reduced overhead of operation, microbolometers are ideal for light weight, remote, low-power applications. A typical microelectromechanical systems (MEMS) microbolometer is comprised of a suspended silicon nitride (SiN) membrane approximately 500 nm thick and coated with an electrically conductive layer of either vanadium oxide (VOX) or amorphous silicon (Si). The thickness of the SiN ensures complete absorption of 10 μm wavelength light, and the electrically conductive layer transduces the SiN temperature rise into an electrical readout. State-of-the-art, commercial microbolometers feature a 12 μm pixel size with response times of order 10 ms, which is set by the suspended thermal mass and the thermal conductance of the support legs. The detectivity of a microbolometer is limited by both thermal noise and Johnson noise. When using a resistance thermometer such as VON, the Johnson noise is typically a factor of five smaller than the thermal noise, making thermal noise dominant.

Microbolometers inherently have an upper bound to their detectivity that is set by photon shot noise due to radiative emission, from both the detector itself and from the imaging source. This thermodynamic limit sets the maximum detectivity of a microbolometer. State-of-the-art microbolometers operate about 30×below this fundamental limit. To operate at the thermodynamic limit, the bolometer must exchange heat only radiatively. The support legs in a commercial bolometer possess the same SiN thickness as the absorber plate, which sets a lower bound on their thermal conductance. Thus, state-of-the-art bolometers can never reach this radiation-dominated fundamental limit, without drastically increasing the absorber area and sacrificing pixel size and resolution.

SUMMARY OF THE INVENTION

The present invention is directed to a nanobolometer comprising a substrate, a membrane suspended above the substrate and structurally tethered to the substrate by a plurality of support beams peripherally attached to the suspended membrane plate, a subwavelength antenna on the front surface of the suspended membrane plate patterned to absorb infrared light incident on the front surface of the suspended membrane plate, and a thermometer disposed on the suspended membrane plate to measure the temperature thereof. The nanobolometer can further comprise a reflecting metallic backplane spaced approximately one-quarter wavelength from the front surface of suspended membrane plate, thereby providing a Salisbury screen to enable greater absorbance of the incident infrared light. The nanobolometer can be fabricated using silicon-based MEMS technology.

BRIEF DESCRIPTION OF THE DRAWINGS

The detailed description will refer to the following drawings, wherein like elements are referred to by like numbers.

DETAILED DESCRIPTION OF THE INVENTION

Figure 1:
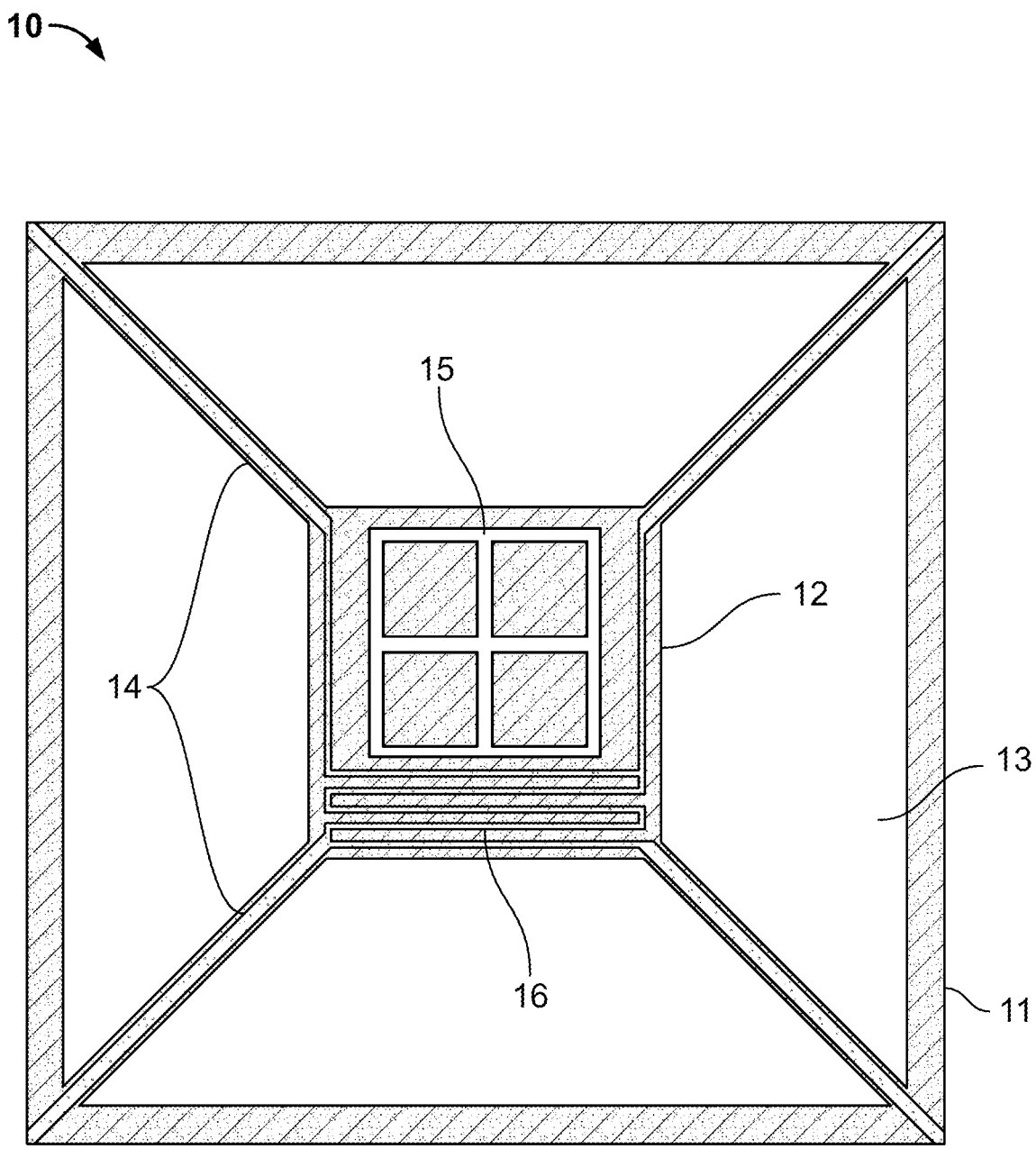
FIG. 1 is a top view schematic illustration of a nanobolometer showing a central membrane plate and support legs or beams, which are all suspended above a substrate. On the central membrane are a subwavelength antenna for light absorption and a thermometer for temperature readout.

To overcome this thermal conductance limitation, the present invention is directed to a nanobolometer comprising a thin suspended membrane structure tethered from a substrate by thin legs or beams. By nanostructuring the suspended membrane plate and tethered beams, while maintaining strong radiation absorption properties via a subwavelength antenna, the ideal, fundamental limit can be closely approached.

The figure-of-merit for IR imaging systems is the specific detectivity, D*. This figure-of-merit is the reciprocal of the noise equivalent power (NEP) normalized to eliminate the dependence of signal bandwidth and detector area, $$D^* = \sqrt{A_D \Delta f}/NEP \qquad (1)$$

where $A_D$ is the detector area and $\Delta f$ is the bandwidth. To maximize D* one needs to minimize the system noise, with the most prevalent noise sources being noise due to thermal fluctuations, Johnson noise, and Joule heating noise. The optimization of NEP takes the form $$NEP = \sqrt{4K_B T_D G_{th}(1+2/|\beta|T_D)\Delta f} \qquad (2)$$

where $k_B$ is Boltzmann's constant, $T_D$ is the detector temperature, $G_{th}$ is the total thermal conductance, and $\beta$ is the temperature coefficient of resistance. See M. Vollmer and K.-P. Mollmann, *Infrared Thermal Imaging: Fundamentals, Research, and Applications*, 2nd Ed, Wiley (2018). The unity term in the parentheses represents thermal fluctuations and the second term in parentheses represents the combined effects of Johnson noise and Joule heating. For a β of $0.03K^{-1}$, which is common for VON, the Johnson noise and Joule heating noise contribute 20% to NEP at 300K, compared to thermal fluctuations. See P. W. Kruse, *Uncooled Thermal Imaging: Arrays, Systems, and Applications*, SPIE Press (2001). Recent work has shown a β of 0.045K$^{-1}$, which corresponds to a 14% NEP contribution. See Y. Jin et. al., "High-resistivity and high-TCR vanadium oxide thin films for infrared imaging prepared by bias target ion beam deposition", Proc. SPIE, Volume 8704, id. 87043C 6 pp. (2013). These NEP values translate to a reduction in D* of 10% and 7%, respectively. Thus, the dominant noise source in bolometers is the thermal noise, and to maximize D* for a given temperature, the goal is to minimize $G_{th}$. See M. Vollmer and K.-P. Mollmann, *Infrared Thermal Imaging: Fundamentals, Research, and Applications*, 2nd Ed, Wiley (2018).

The thermal noise is a combination of heat transfer mechanisms, which are phonon fluctuations due to heat conduction and photon fluctuations due to thermal radiation. These terms are established through their thermal conductances as $G_{th}=G_{th,cond} G_{th,rad}$, where $G_{th,cond}$ and $G_{th,rad}$ are the conductances due to heat diffusion and radiation, respectively. The ultimate heat minimization limit is where one essentially eliminates $G_{th,cond}$ such that only thermal radiation is present. State-of-the-art bolometers are heat conduction limited due to the mechanically required size of their support legs and can never reach the photon shot noise limit. See L. Razzari et al., Opt. Express 19(27), 26088 (2011). This bound is known as the ideal bolometer limit and at 300K takes the form and value of $$D^* = \frac{1}{4\sqrt{\sigma k_B T_D}} = 1.8 \times 10^{10} \text{ cm}\sqrt{\text{Hz}}/W \quad (3)$$

where σ is the Stephan-Boltzmann constant. This value of D* represents the photon shot noise (thermodynamic) limit for a bolometer. State-of-the-art bolometers operate at 30×below this thermodynamic limit.

FIG. 1 illustrates a nanobolometer 10 of the present invention. The nanobolometer 10 comprises a substrate 11, a membrane 12 suspended above and separated from the substrate 11 by a cavity 13 and structurally tethered to the substrate 11 by a plurality of support beams 14 peripherally attached to the suspended membrane plate 12, a subwavelength antenna 15 on the front surface of the suspended membrane plate 12 patterned to absorb infrared light incident on the front surface of the suspended membrane plate 12, and a thermometer 16 disposed on the suspended membrane plate 12 to measure the temperature thereof.

The nanobolometer can be fabricated in a silicon substrate using silicon-based MEMS technology. The suspended membrane plate can have a thickness of less than about 100 nm and greater than about 10 nm and is preferably constructed of a low thermal conductivity material, such as silicon nitride, although silicon could also be used. The membrane is preferably a square or rectangle, although other shapes can also be used. The area of a square membrane can be less than about 100 μm×100 μm, and greater than about 8 μm×8 μm to provide a typical pixel size. The support beams should have a small cross-section and be of sufficient length to provide adequate thermal insulation of the suspended membrane plate. For example, the support beams can have a width of between about 20 nm and 1 μm and can be of the same thickness (e.g., 10-100 nm) and made of the same material (e.g., SiN) as the suspended membrane. The length of the support beams can be greater than 1 μm and as long as about 20 μm or more to provide good thermal isolation between the suspended membrane plate and the substrate. Typically, the wavelength range of the incident light can be about 8 μm to 14 μm, although infrared light outside of this range can also be used. The subwavelength antenna can comprise a periodic pattern having a periodicity of less than the wavelength of the incident light. For example, the periodic pattern can comprise an array of square apertures or holes (as shown), crosses, or simply a square patch, although other patterns can also be used. The antenna is preferably made of a metal with a thickness of between about 3 nm and 12 nm. For example, the antenna can be made of gold or a gold-germanium alloy. However, a thin layer of infrared absorbing material, such as titanium nitride (TiN), can also be used as a subwavelength antenna. For example, the thermometer can be a resistance thermometer having a serpentine pattern deposited on the suspended membrane plate (as shown).

An exemplary nanobolometer can be constructed from a 20 nm-thick SiN suspended membrane, with support legs that are approximately 20 nm thick, 50 nm wide, and 5 μm long. The structure can be released from the substrate using a combination of both dry and wet etching of a cavity in the substrate underneath the suspended membrane plate and support beams, with the patterning for etching and metallization performed with electron-beam lithography. The central suspended membrane plate can be a 4 μm-square and that supports a subwavelength antenna and a resistance thermometer (thermistor) for temperature readout. The total footprint of this exemplary bolometer is comparable to that of a standard 12 μm pixel. For the bolometer to operate properly, it must absorb the incident infrared radiation. Commercial bolometers use 500 nm-thick SiN to absorb incident radiation. The 20 nm-thick SiN membrane in the exemplary nanobolometer does not absorb light. To compensate for this lack of SiN absorption, an ultrathin film of TiN can be used as a subwavelength antenna. Based on a transfer matrix calculation, a 4 nm-thick TiN layer on 20 nm of SiN has an average absorptance of 49% from 8-13 μm, close to the theoretical limit of 50%. See J. R. Piper et al., Appl. Phys. Lett. 104(25), 251110 (2014). TiN films can be sputtered on large area substrates and their permittivity with ellipsometry can be characterized. The absorptance of the bolometer with TiN can be measured using an FTIR microscope.

A typical lossy, metallic subwavelength nanoantenna has a Q factor of 5-10. Due to field enhancement, the absorption cross-section can be up to 25×larger than the geometrical cross-section, providing the same fill-factor as a commercial bolometer. See E. Sakat et al., *Optica* 5(2), 175 (2018); and S. D. Rezaei et al., *Opt. Express* 25(22), 27652 (2017). Most published antenna designs use 40-50 nm thick metal. However, this thickness would add significant thermal mass to the nanobolometer and reduce its thermal response time. Based on initial simulations, the antenna thickness should not require more than 4 nm of material, however a sub-10 nm-thick antenna has not been previously explored. The majority of subwavelength antenna work for IR imaging systems has focused on photodetectors. There has been some effort towards larger-scale MEMS bolometers, with some recent work in this field including simulations of antennas as a route towards fabricating ultra-low mass bolometers. D. W. Peters et al., "Metamaterial-inspired high-absorption surfaces for thermal infrared applications," Proc. SPIE 7609, Photonic and Phononic Crystal Materials and Devices X, 76091C (23 Feb. 2010); Dao et al., Micromachines 2019 10(6), 416 (2019); and J. Jung et al., *Sci. Rep.* 7, 430 (2017).

Finite difference time domain (FDTD) simulations can be used to determine the antenna geometry and thickness with the goal of achieving a maximum absorptance of 50%. Fundamentally, an antenna-coupled bolometer cannot reach 100% absorption because the antenna can radiate in both directions (top and bottom), whereas the incident source is only from one direction. To circumvent this limitation, a common strategy is to incorporate an optically opaque metallic backplane and a λ/4 spacer (i.e., Salisbury screen). Specific silicon nitride compositions and wafer bonding can be combined to create a λ/4 gap and a metallic backplane to achieve 100% absorption.

For a nanobolometer with support beams 100 nm wide and 2 μm long using 20 nm-thick SiN, estimates show that $G_{th,cond} \sim 10^{-8}$ W/K can be achieved (commercial bolometers have $G_{th,cond} \sim 10^{-7}$ W/K). Assuming 100% absorption (with a λ/4 backplane) for a subwavelength antenna with a critical dimension of 3 μm and an optical cross-section enhancement factor of 25×(5× for the critical dimension), the radiative thermal conductance is estimated to be $G_{th,rad} \sim 10^{-9}$ W/K. These conductance values correspond to a $D^*=7\times10^9$ cm(Hz)$^{1/2}$/W, which is a 10×increase compared to a commercial state-of-the-art bolometer. Furthermore, the nanobolometer would have thermal time constant of 100 μs (100× faster than a commercial bolometer). By pushing the fabrication limits to have support beams that are 20 nm wide and 20 μm long, one obtains $G_{th,cond} \sim 10^{-10}$ W/K and $G_{th,rad} \sim 10^{-9}$ W/K and achieves a $D^*=1.7\times 10^{10}$ cm(Hz)$^{1/2}$/W, which is a 30×increase above commercial bolometers. Even with this higher thermal conductance, the time constant is 1 ms, 10×better than a typical bolometer.

Figure 2:
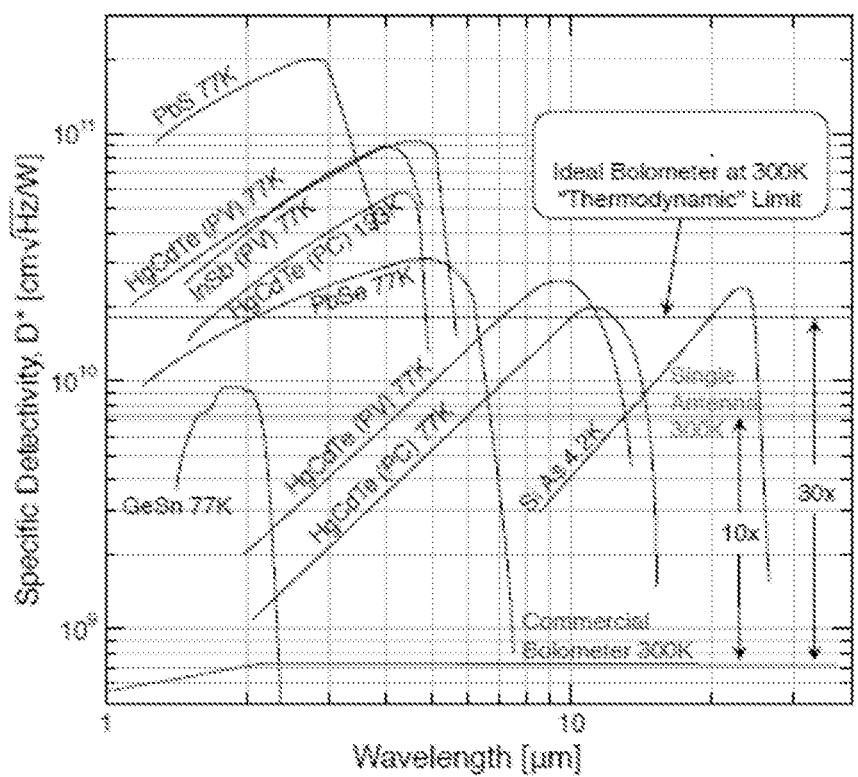
FIG. 2 is a graph of the specific detectivity of cooled detectors and uncooled bolometers.

FIG. 2 shows state-of-the-art cooled detector technologies and the aforementioned performance metrics of the nanobolometer. Cooled photodetectors (PC) and photovoltaics (PV) display detectivities well above a commercial bolometer at 300K (labeled "Commercial Bolometer 300K"). The 10×improvement gained in the exemplary nanobolometer (labeled "Single Antenna 300K)) places it in the midst of several cooled technologies, making it quite competitive. By pushing the limits of nanofabrication, one can reach the thermodynamic (photon shot noise) limit shown by the curve labeled "Ideal Bolometer at 300K", which is extremely competitive with cooled IR imaging technologies.

The present invention has been described as a nanoscale bolometer operating near the thermodynamic limit. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nanobolometer, comprising:
   a substrate,
   a membrane plate suspended above the substrate and structurally tethered to the substrate by a plurality of support beams peripherally attached to and in the same plane as the suspended membrane plate, wherein the suspended membrane plate and the plurality of support beams comprise silicon nitride or silicon and wherein the thickness of the suspended membrane plate and the plurality of support beams is less than 100 nm,
   a subwavelength antenna on the front surface of the suspended membrane plate configured to absorb infrared light incident on the front surface of the suspended membrane plate, and
   a thermometer disposed on the suspended membrane plate to measure the temperature thereof.

2. The nanobolometer of claim 1, wherein the suspended membrane plate comprises a square.

3. The nanobolometer of claim 1, wherein the area of the suspended membrane plate is less than 100 μm×100 μm.

4. The nanobolometer of claim 1, wherein a width of each of the plurality of support beams is less than 1 μm.

5. The nanobolometer of claim 1, wherein a length of each of the plurality of support beams is greater than 1 μm.

6. The nanobolometer of claim 1, wherein the thickness of the subwavelength antenna is less than 20 nm.

7. The nanobolometer of claim 1, wherein the subwavelength antenna comprises a periodic pattern having a periodicity less than the wavelength of the incident infrared light.

8. The nanobolometer of claim 7, wherein the incident infrared light has a wavelength of between 8 and 14 microns.

9. The nanobolometer of claim 7, wherein the subwavelength antenna comprises a metal.

10. The nanobolometer of claim 1, wherein the subwavelength antenna comprises titanium nitride.

11. The nanobolometer of claim 1, wherein the thermometer comprises a resistance thermometer.

12. The nanobolometer of claim 11, wherein the resistance thermometer comprises a serpentine pattern.

13. The nanobolometer of claim 1, wherein the substrate comprises silicon.

14. The nanobolometer of claim 1, further comprising a reflecting metallic backplane spaced approximately one-quarter wavelength from the front surface of suspended membrane plate, thereby providing a Salisbury screen to enable greater absorbance of the incident infrared light.

15. A nanobolometer, comprising:
    a substrate,
    a membrane plate suspended above the substrate and structurally tethered to the substrate by a plurality of support beams peripherally attached to the suspended membrane plate,
    a subwavelength antenna on the front surface of the suspended membrane plate configured to absorb infrared light incident on the front surface of the suspended membrane plate, wherein the thickness of the subwavelength antenna is less than 20 nm, and
    a thermometer disposed on the suspended membrane plate to measure the temperature thereof.

16. The nanobolometer of claim 15, wherein a thickness of the suspended membrane plate is less than 100 nm.

17. The nanobolometer of claim 15, wherein a thickness of each of the plurality of support beams is less than 100 nm.

18. The nanobolometer of claim 15, wherein the suspended membrane plate and the plurality of support beams comprise silicon nitride or silicon.

19. The nanobolometer of claim 15, wherein the subwavelength antenna comprises a periodic pattern having a periodicity less than the wavelength of the incident infrared light.

20. The nanobolometer of claim 15, wherein the incident infrared light has a wavelength of between 8 and 14 microns.

21. The nanobolometer of claim 19, wherein the subwavelength antenna comprises a metal.

22. The nanobolometer of claim 15, wherein the subwavelength antenna comprises titanium nitride.

23. The nanobolometer of claim 15, wherein the substrate comprises silicon.

24. The nanobolometer of claim 15, further comprising a reflecting metallic backplane spaced approximately one-quarter wavelength from the front surface of suspended membrane plate, thereby providing a Salisbury screen to enable greater absorbance of the incident infrared light.

25. A nanobolometer, comprising:
   a substrate,
   a membrane plate suspended above the substrate and structurally tethered to the substrate by a plurality of support beams peripherally attached to the suspended membrane plate,
   a subwavelength antenna on the front surface of the suspended membrane plate configured to absorb infrared light incident on the front surface of the suspended membrane plate, and
   a resistance thermometer disposed on the suspended membrane plate to measure the temperature thereof, wherein the resistance thermometer comprises a serpentine pattern.

26. The nanobolometer of claim 25, wherein a thickness of the suspended membrane plate is less than 100 nm.

27. The nanobolometer of claim 25, wherein a thickness of each of the plurality of support beams is less than 100 nm.

28. The nanobolometer of claim 25, wherein the suspended membrane plate and the plurality of support beams comprise silicon nitride or silicon.

29. The nanobolometer of claim 25, wherein the substrate comprises silicon.

30. The nanobolometer of claim 25, further comprising a reflecting metallic backplane spaced approximately one-quarter wavelength from the front surface of suspended membrane plate, thereby providing a Salisbury screen to enable greater absorbance of the incident infrared light.

* * * * *